United States Patent [19]
Kimura et al.

[11] 3,786,719
[45] Jan. 22, 1974

[54] HOBBING CUTTER

[76] Inventors: Kanbei Kimura, 1-48-5, Nogata, Nakano-ku, Tokyo; Masato Ainoura, 1253, Eguchi, Kitashigeyasa-machi, Miyaki, both of Japan

[22] Filed: May 4, 1972

[21] Appl. No.: 250,402

Related U.S. Application Data

[63] Continuation of Ser. No. 39,085, May 20, 1970.

[52] U.S. Cl. ................................. 90/1.6, 29/103 B
[51] Int. Cl. ........................ B23f 19/06, B26d 1/12
[58] Field of Search..29/103, 103 B; 90/1, 1.6, 1.6 A

[56] References Cited
UNITED STATES PATENTS

| | | | |
|---|---|---|---|
| 2,660,929 | 12/1953 | Praeg | 90/1.6 |
| 1,419,917 | 6/1922 | Camp | 29/103 R |
| 1,514,012 | 11/1924 | Rambuscheck | 29/103 R |
| 2,353,768 | 7/1944 | Shlesinger | 29/103 B |

FOREIGN PATENTS OR APPLICATIONS

| | | | |
|---|---|---|---|
| 492,876 | 2/1930 | Germany | 29/103 |
| 759,104 | 3/1953 | Germany | 29/103 B |

*Primary Examiner*—Harrison L. Hinson
*Attorney, Agent, or Firm*—Pierce, Scheffler & Parker

[57] ABSTRACT

The method of finishing the sides of the teeth of a roughly formed and hardened gear blank, of which the bottom portions of the grooves between adjacent teeth have been cleared away, by means of a hobbing cutter wherein the top edges of the cutter blades run free of the bottoms of the grooves and the leading surfaces of the blades including both side edges thereof which serve to perform the finish-cutting of the confronting sides of adjacent teeth are inclined in a backward direction at an angle of between 15° and 60° relative to the direction of rotation of the cutter.

1 Claim, 4 Drawing Figures

PATENTED JAN 22 1974

3,786,719

INVENTORS
Kanbei Kimura
Masato Ainoura
BY
Pierre, Scheffler & Parker
Attorneys

HOBBING CUTTER

This is a continuation, of application Ser. No. 39,085 filed May 20, 1970.

This invention relates to a hobbing cutter especially suitable for finishing toothed gears.

One object of the present invention is to provide a hobbing cutter which enables to finish a toothed gear of fairly large size without resharpening in the course of finish cutting.

Other object of the present invention is to provide a hobbing cutter which enables to manufacture toothed gear of quite accurate profile easily.

Another object of the present invention is to permit utilization of very hard material such as sintered carbide or ceramics for that of tips of hobbing cutters overcomming its defect of brittleness.

Further object of the present invention is to provide a hobbing cutter which enables to finish a previously hardened blank with roughly formed teeth.

All of hobbing cutters of heretofore known type are adapted to form a toothed gear from a cylindrical solid gear blank by removing off material in the groove portions. Accordingly, each cutting blade of the hobbing cutter of heretofore known type is provided with a top cutting edge together with side cutting edges, and the leading surface of the blade is nearly radial to the axis of the cutter to obtain a suitable rake angle for the top cutting edge which removes off most material from the tooth-grooves generating the bottom surfaces of the grooves.

We noticed that the top cutting edges which generate bottom surfaces of the tooth-grooves are more heavily weared or injured than the side cutting edges which generate teeth surfaces. This fact is observed even in a mere finish cutting, not only in a cutting from a solid cylindrical blank. And the life of the hobbing cutter is affected mainly by the wear or injury on the top cutting edges.

We considered that the life and the performance of the hobbing cutter will be much improved if the cutting action of top edges is obandoned, because in such a case, the life and the performance are determined only by the wear on side edges.

We considered further that the leading surfaces of the blades will be heavily inclined so as to improve cutting action of side edges, because in a condition wherein the cutting action of top edges is abandoned, it is unnecessary to provide any rake angle for the top edges of blades and the inclination of the blades will be determined arbitrarily.

The present invention bases upon the above considerations, and according to the present invention, there is provided a hobbing cutter characterized in that the leading surfaces of blades including both side cutting edges of each blade are inclined backwardly in an amount ranging from 15° to 60°.

The objects and the advantages of the present invention will be apparent from the following description in connection with the accompanying drawings in which.

Figure 1:
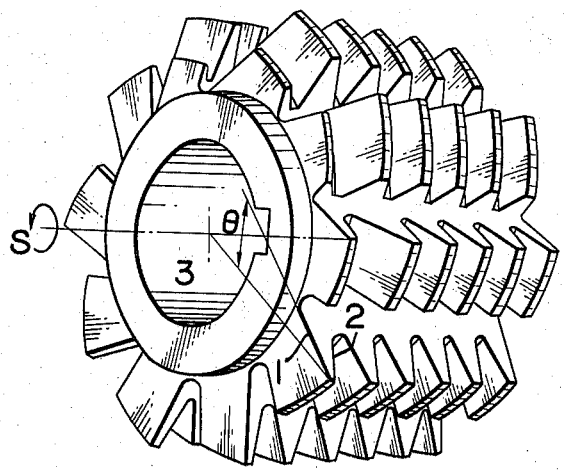
FIG. 1 is a perspective view of a hobbing cutter according to the present invention.
Figure 2:
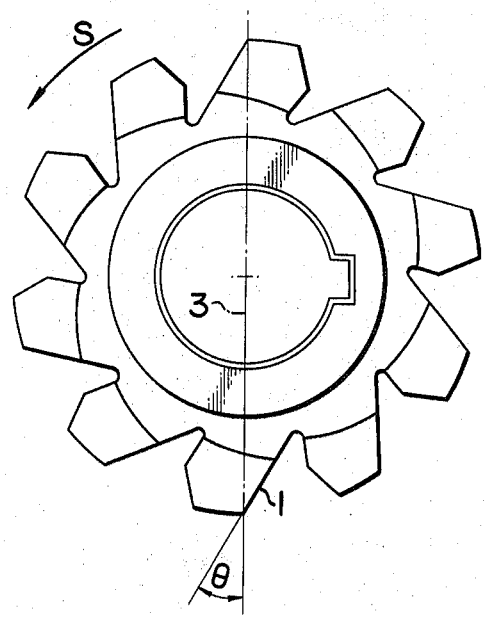
FIG. 2 is the side view of the hobbing cutter shown in FIG. 1.

As shown in FIG. 1 and FIG. 2, the hobbing cutter according to the present invention is provided with blades of which leading surfaces are heavily inclined backwardly. The direction of rotation of the hobbing cutter is shown by an arrow S, and the side cutting edges are shown by mumerals 1 and 2. Each leading surface including the side cutting edges 1 and 2 is inclined backwardly in an amount ranging from 15° to 60°.

This hobbing cutter is that of quite different form compared with those of heretofore known type. The top edge of each blade does not concern with any cutting action, and only the side edges 1 and 2 concern with the cutting action for generating the teeth surfaces. In other word, top edges of this hobbing cutter are not expected as cutting edges. Accordingly, this hobbing cutter must be used for finishing roughly formed blank of which bottom portions of the grooves are previously cleared away.

In the case of an ordinary hob, top fillets for providing top cutting edges are necessary portions for generating bottom surfaces of the tooth-grooves. But, in the case of hobbing cutter according to the present invention, most portions of top fillets may be deleted as unnecessary ones shortening the radial length of the blades.

Figure 3A:
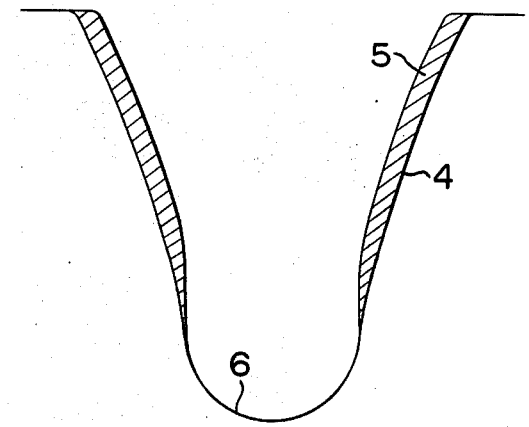
FIGS. 3a and 3b show two examples of roughly formed tooth-grooves which may be finished by hobbing cutters according to the present invention.
Figure 3B:
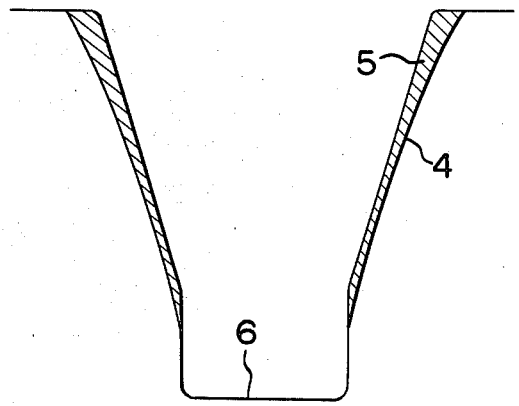

Two examples of tooth-groove profiles of the roughly formed blanks are shown in FIGS. 3a and 3b. In these figures, 4 shows a final frofile and 5 shows a zone which will be cut away by the side cutting edges 1 and 2 of the hobbing cutter. The top edges of the blades do not contact with the bottom surface 6 of the groove which in FIG. 3a has a final, concave shape and in FIG. 3b a flat shape.

In the case of the hobbing cutter according to the present invention, the top edges of the blades are not used as "cutting edges." And consequently, the term "rake angle" is a meaningless one. But, if the use of this term is permitted in mere relation with an ordinary hobbing cutter, it may be said that the range of rake angle of the hobbing cutter according to the present invention is $-15°$ to $-60°$. The present invention introduces a highly negative rake angle which is prohibited for an ordinary hobbing cutter by an abandonment of cutting action at the top edges of blades. The heavily backward inclination of the blade is utilized for carrying out cutting in an oblique direction. This oblique cutting, as in a case of cutting by a knife, reduces effective wedge angle of the blades, and lightens shock and cutting resistance remarkably so as to accomplish various objects already mentioned.

What we claim is:

1. In the method of finishing the sides of the teeth of a roughly formed and hardened gear blank of which the bottom portions of the grooves between adjacent teeth have been cleared away, the improvement wherein the opposite sides of the teeth are finished with a hobbing cutter, the top edges of the cutter blades running free of the bottoms of the grooves and the leading surfaces of the blades including both side edges thereof which respectively serve to perform the finish cutting of the confronting sides of adjacent teeth are inclined in a backward direction at an angle between 15° and 60° relative to the direction of rotation of the cutter.

* * * * *